(No Model.)
C. SCHANTZ.
MOUSE CAGE.
No. 321,643. Patented July 7, 1885.
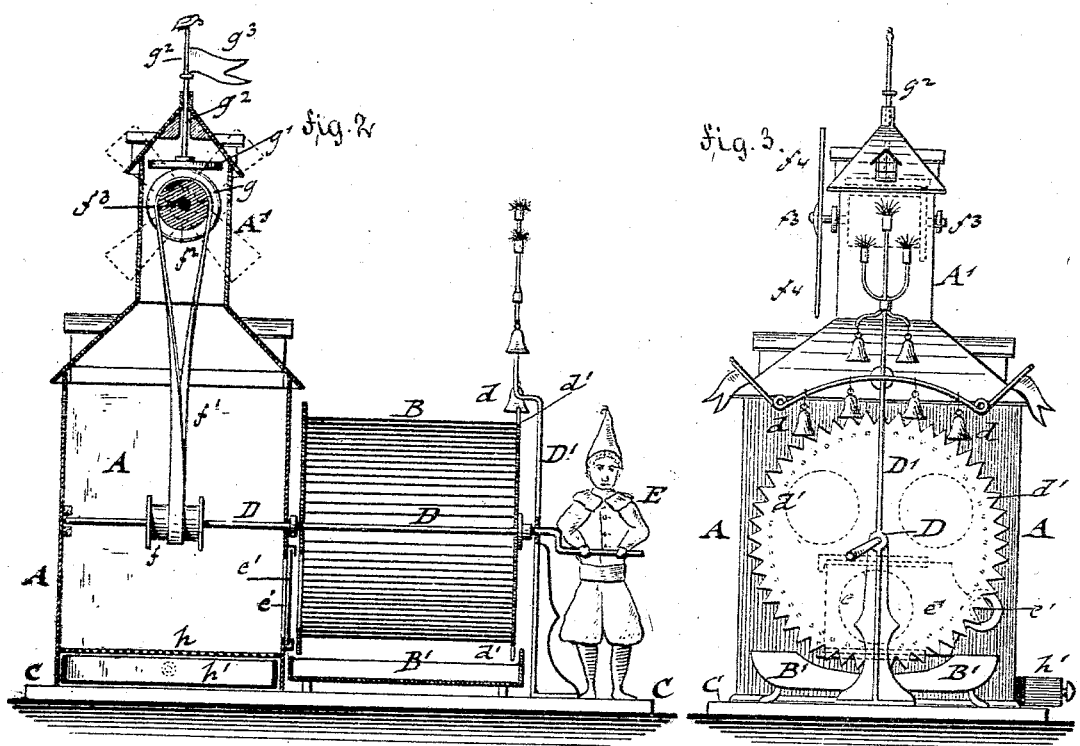
WITNESSES:
INVENTOR
Charles Schantz
BY
Goepel & Raegener
ATTORNEYS.

UNITED STATES PATENT OFFICE.

CHARLES SCHANTZ, OF ELIZABETH, NEW JERSEY.

MOUSE-CAGE.

SPECIFICATION forming part of Letters Patent No. 321,643, dated July 7, 1885.

Application filed July 18, 1884. (No model.)

*To all whom it may concern:*

Be it known that I, CHARLES SCHANTZ, of Elizabeth, in the county of Union and State of New Jersey, have invented certain new and useful Improvements in Mouse-Cages, of which the following is a specification.

The object of this invention is to furnish an improved cage for mice and other small animals, which serves at the same time as a toy for the amusement of children; and the invention consists of a cage having a tower above the cage and a wire drum at one side of the same, said drum being provided with a spur-wheel that actuates bells. The shaft of the rotating drum operates by a crank a a toy figure, and by a belt and pulley transmission a windmill and a vane mounted on the tower of the cage.

In the accompanying drawings, Figure 1 represents a front elevation of my improved mouse-cage. Fig. 2 is a vertical longitudinal section of the same, and Fig. 3 an end elevation with the toy figure removed.

Similar letters of reference indicate corresponding parts.

A in the drawings represents the cage proper, which is made in the shape of a house, and provided with doors and windows. B is a rotating wire drum, which is arranged adjoining to the cage A, both being mounted on a common platform, C. The shaft D of the rotating drum B turns in bearings of the cage A and of an upright standard, D', which is extended in upward direction and provided with bells $d$ and other ornaments, said bells being sounded by contact with the teeth of a spur-wheel, $d'$, arranged at the circumference of one of the heads of the rotating drum B. The outer end of the shaft D is bent in the form of a crank, to which a toy figure, E, is applied, said toy figure following the motion of the crank, so that it has the appearance of turning the drum. A mouse or other small animal is placed in the cage and can pass from the same through an opening, $e$, into the drum. The opening $e$ is opened or closed by a slide, $e'$. As the animal moves over the wires of the drum the same is rotated in the same manner as in the well-known squirrel-cages. The rotary motion imparted to the shaft D is transmitted by a pulley, $f$, and belt $f'$ to a pulley, $f^2$, on a shaft, $f^3$, that turns in bearings of the walls of a tower, A', above the cage A, said shaft carrying at its outer end wings $f^4$, which represent a windmill. A friction-disk, $g$, on the shaft $f^3$, transmits motion to a horizontal friction-disk, $g'$, of a vertical shaft, $g^2$, that passes through the roof of the tower, and carries at its outer end a vane, $g^3$. The cage A is provided at the bottom with a wire screen, $h$, below which a sliding drawer, $h'$, is arranged, by which the excrements and food-remnants can be removed. A pan, B, is also arranged below the drum for the same purpose. Whenever the mouse or other animal turns the drum B, it will simultaneously oscillate the figure E, sound the bells $d$, and turn the windmill and the vane, so as to give thereby considerable amusement to children watching the movements of the animal and the different operations of the movable parts described.

Having thus described my invention, I claim as new and desire to secure by Letters Patent—

1. The combination of a cage, A, rotating drum B, crank-shaft D, toy figure E, upright standard D', having bells $d\ d$, and teeth $d'$ at the circumference of one head of the drum, substantially as set forth.

2. The combination of the cage A, having a tower A', rotating drum B, crank-shaft D, belt and pulley transmission $f\ f'\ f^2$, shaft $f^3$, having extension-wings $f^4$, friction-disks $g\ g'$, and vertical shaft $g^2$, having a vane, $g^3$, substantially as set forth.

3. The combination of a cage, A, having a tower, A', rotating drum B, crank-shaft D, toy figure E, applied to the crank-shaft, upright standard D', having bells $d\ d$, teeth $d'\ d'$, belt and pulley transmission $f\ f'\ f^2$, horizontal shaft $f^3$, having wings $f^4$, friction-disks $g\ g'$, and vertical shaft $g^2$, having a vane, $g^3$, substantially as set forth.

In testimony that I claim the foregoing as my invention I have signed my name in presence of two subscribing witnesses.

CHARLES SCHANTZ.

Witnesses:
PAUL GOEPEL,
CARL KARP.